(12) United States Patent
Phu

(10) Patent No.: US 10,717,937 B2
(45) Date of Patent: Jul. 21, 2020

(54) PROCESS FOR LPG RECOVERY

(71) Applicant: HALDOR TOPSØE A/S, Kgs. Lyngby (DK)

(72) Inventor: Nghia Pham Phu, Skodsborg (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 216 days.

(21) Appl. No.: 15/746,359

(22) PCT Filed: Sep. 21, 2016

(86) PCT No.: PCT/EP2016/072356
§ 371 (c)(1),
(2) Date: Jan. 19, 2018

(87) PCT Pub. No.: WO2017/050795
PCT Pub. Date: Mar. 30, 2017

(65) Prior Publication Data
US 2018/0216011 A1  Aug. 2, 2018

(30) Foreign Application Priority Data

Sep. 25, 2015 (DK) .................................. 2015 00563

(51) Int. Cl.
*B01D 53/02* (2006.01)
*C10G 5/04* (2006.01)
(Continued)

(52) U.S. Cl.
CPC ............. *C10G 5/04* (2013.01); *B01D 3/141* (2013.01); *B01D 3/143* (2013.01); *B01D 53/1493* (2013.01); *B01D 53/18* (2013.01); *C10G 5/00* (2013.01); *C10G 5/06* (2013.01); *C10G 7/02* (2013.01); *B01D 2252/20* (2013.01); *C10G 2400/28* (2013.01)

(58) Field of Classification Search
CPC .... B01D 2252/20; B01D 3/141; B01D 3/143; B01D 53/1493; B01D 53/18; C01G 2400/28; C10G 5/00; C10G 5/04; C10G 5/06; C10G 7/02
See application file for complete search history.

(56) References Cited

U.S. PATENT DOCUMENTS 3,574,089 A  4/1971 Forbes
4,072,604 A  2/1978 Ward
(Continued)

FOREIGN PATENT DOCUMENTS

CN  1671638 A  9/2005
CN  202246578 U  5/2012
(Continued)

OTHER PUBLICATIONS

Translation of WO2013/076433 A1; Da Silva (Year: 2013).*
(Continued)

*Primary Examiner* — Christopher P Jones
(74) *Attorney, Agent, or Firm* — Leydig, Voit & Mayer, Ltd.

(57) ABSTRACT

Process and plant for recovering LPG in a refinery process combining the use of sponge absorber, deethanizer and debutanizer. The process and plant enable high LPG recovery and removal of hydrogen sulphide in the LPG product to low levels.

11 Claims, 4 Drawing Sheets

(51) Int. Cl.
*C10G 7/02* (2006.01)
*C10G 5/06* (2006.01)
*B01D 3/14* (2006.01)
*B01D 53/14* (2006.01)
*B01D 53/18* (2006.01)
*C10G 5/00* (2006.01)

(56) References Cited

U.S. PATENT DOCUMENTS

| | | | |
|---|---|---|---|
| 4,990,712 A | 2/1991 | Harandi et al. | |
| 2003/0075485 A1 | 4/2003 | Ghijsen | |
| 2012/0141333 A1* | 6/2012 | Ulas Acikgoz | B01D 3/141 422/187 |
| 2012/0172649 A1 | 7/2012 | Yadav et al. | |
| 2013/0256093 A1 | 10/2013 | Ishiwata et al. | |
| 2015/0053590 A1 | 2/2015 | Ladkat et al. | |
| 2016/0102032 A1* | 4/2016 | Du | B01J 8/1836 585/323 |

FOREIGN PATENT DOCUMENTS

| | | |
|---|---|---|
| CN | 1640992 A | 7/2015 |
| CN | 101177618 A | 5/2018 |
| SU | 223783 | 11/1968 |
| WO | WO 2013/076433 A1 | 5/2013 |

OTHER PUBLICATIONS

Chinese First Office Action dated Jul. 1, 2019 in CN 2016800454660.
International Search Report with Written Opinion corresponding to International Patent Application No. PCT/EP2016/072356, dated Dec. 16, 2016.
Search Report and Opinion dated May 9, 2016, corresponding to Danish Patent Application No. PA 2015 00563.
Russian Office Action, dated Jan. 15, 2020, in Russian Patent Application No. 2018115230, 8 pp.

\* cited by examiner

PRIOR ART

PROCESS FOR LPG RECOVERY

CROSS-REFERENCE TO RELATED APPLICATIONS

This application is a 35 U.S.C. § 371 filing of International Application No. PCT/EP2016/072356, filed Sep. 21, 2016, which claims the benefit of and priority to Danish Patent Application No. PA 2015 00563, filed Sep. 25, 2015, each of which is hereby incorporated by reference in its entirety.

FIELD OF THE INVENTION

The present invention relates to a process for recovering liquid petroleum gas (LPG) from the fractionation section of a refinery process, particularly from the fractionation section of a hydrocracking unit.

BACKGROUND OF THE INVENTION

LPG is commonly seen as a mixture predominantly i.e. at least 98 vol % consisting of propane and butane, which can be recovered from well-known refinery processes such as hydrocracking. LPG is a valuable gas that is used in industrial and domestic applications and whose demand is steadily increasing in particularly Asia.

Conventionally, LPG is recovered in the fractionation section of a hydrocracking unit by passing a stripper overhead product stream through a sponge absorber (LPG absorber), debutanizer column, deethanizer column, amine absorber and water wash, resulting in an LPG recovery of 90-95% and a LPG product with a hydrogen sulphide ($H_2S$) content of about 35 wppm or less.

Stricter environmental regulations require however lower content of hydrogen sulphide ($H_2S$) in the LPG product, which implies higher capacity of amine absorbers for removing of $H_2S$ in the LPG rich streams, or even amine absorbers treating the entire feed gas.

US2015/0053590 A1 discloses a process for improved efficiency of sponge absorption by introducing two different feed points to the sponge absorber, each coming from two separate strippers, i.e. a cold and hot stripper. Accordingly, two strippers are required compared to normally one stripper. Hydrogen sulphide is removed by either treating the entire feed gas in separate amine absorbers or by treating the LPG product stream in an amine absorber.

It would be desirable to reduce the amount of equipment required in the recovery of LPG and to reduce the energy consumption as much as possible, while still maintaining high LPG recovery and required LPG product specifications, not least in terms of $H_2S$ content.

It is therefore an object of the present invention to provide a process and plant with LPG recovery of at least 90-95% and with a hydrogen sulphide ($H_2S$) content in the LPG product of not more than 10 wppm, for instance 9 or 5 wppm or even lower.

It is another object of the present invention to provide a process and plant with reduced plot area than prior art processes while still keeping a LPG recovery of at least 90-95% and no more than 10 wppm $H_2S$ in the LPG product.

It is still another object of the present invention to provide a process and plant for LPG recovery which is simpler and more flexible than prior art processes, and thereby less expensive.

These and other objects are solved by the present invention.

SUMMARY OF THE INVENTION

In a first aspect, the invention is a process for recovering LPG from the fractionation section of a refinery process comprising the steps of:

(a) passing a feed stream comprising a stripper overhead product through a sponge absorber (LPG absorber), and separating an off-gas stream from the top section of the sponge absorber and a light oil stream (LPG rich stream) from the bottom section of the sponge absorber;

(b) fractionating the light oil stream into (i) an overhead vapour in the form of a $C_3$ stripped stream comprising less than 20% butane or propane, without condensing and without recycling of condensed overhead vapour into this fractionating step, (ii) a LPG product stream and (iii) a stabilized naphtha stream.

It has been found that the invention as defined above enables reduced investment costs and operating costs compared to prior art processes while at the same time providing better performance, simplicity, flexibility and compliance with LPG product requirements.

As used herein, the term "stripper overhead product" means both vapour and liquid product drawn from the stripper overhead drum, comprising water, hydrogen, gases like $N_2$ and CO, sour gas like hydrogen sulphide ($H_2S$) and carbon dioxides ($CO_2$), and hydrocarbons like methane, $C_2$ compounds, $C_3$ compounds, $C_4$ compounds and $C_{5+}$ compounds.

As used herein, the term "LPG" means liquid petroleum gas in the form of a mixture comprising predominantly propane ($C_3H_8$) and butane ($C_4H_{10}$), i.e. at least 95 vol % propane and butane, with $C_{2-}$ compounds not exceeding 2 vol %, $C_{5+}$ compounds not exceeding 3 vol %, in which $C_{2-}$ compounds are alkanes or alkenes having 2 or less carbon atoms, and $C_{5+}$ compounds are alkanes or alkenes having 5 or more carbon atoms. Other constituents such as hydrogen sulphide ($H_2S$) may be present in LPG in much lesser amounts, e.g. $H_2S$ is below 50 wppm, often below 40 wppm. The amount of $H_2S$ may vary significantly depending on the required specifications and may be much lower than 40 wppm, for instance 10 wppm or even lower, for instance 9 or 5 wppm or 1 wppm.

As used herein, the term "stabilized naphtha" is interchangeable with what is normally known as "light stabilized naphta" or "light naphta" or simply "naphtha". It is the fraction boiling between 30° C. and 180° C., often below 90° C. and comprising predominantly compounds with 5-12 carbon atom, often with 5-6 carbon atoms, i.e. at least 95 vol % of compounds with 5-6 carbon atoms, with $C_{4-}$ compounds not exceeding 1 vol %, and in which $C_{4-}$ compounds are alkanes or alkenes having 4 or less carbon atoms.

As used herein, the term "LPG recovery" means the weight percentage of LPG in the LPG product stream with respect to LPG content in the stripper overhead product stream.

As used herein, the term "$C_3$ stripped stream" means the overhead vapour withdrawn from a deethanizer column used for fractionating and which is low in $C_{3+}$ compounds such as propane and butane. Suitably the "$C_3$ stripped stream" contains water, hydrogen, methane ($CH_4$), ethane ($C_2H_6$), $H_2S$ and small amounts of propane and butane, i.e. up to 20 mol %, e.g. 1-20 mol %, such as 1-10 mol % propane and butane.

In a particular embodiment in connection with the above or any of the below embodiments, the process further comprises mixing at least a portion of the $C_3$ stripped stream of step (b) with stripper overhead product to form said feed stream of step (a), i.e. feed stream comprising a stripper overhead product. Accordingly, the feed stream comprising a stripper overhead product may contain: a stripper overhead product, stripper overhead product mixed with overhead vapour in the form of a $C_3$ stripped stream, stripper overhead product mixed with any other stream.

It has been found that by feeding to the sponge absorber a mixture of a stripper overhead product stream from the fractionation section of a refinery process such as hydrocracking and overhead vapour of fractionating step (b) in the form of a $C_3$ stripped stream, it is not only possible to remove ethane ($C_2H_6$), but also $H_2S$ from the LPG product down to 10 wppm or below, for instance 5 wppm or below. Suitably, the entire $C_3$ stripped stream of step (b) is mixed with the stripper overhead product stream of step (a). The higher the portion of the $C_3$ stripped stream used in such mixing, the higher the LPG recovery.

Accordingly, by allowing the entire $C_3$ stripped stream to be mixed, a high LPG recovery together with a high $H_2S$ removal in the process is possible.

In yet another particular embodiment in connection with any of the above or below embodiments, the process further comprises mixing a portion of the stabilized naphtha stream of step (b) with the off-gas stream of step (a). While the stabilized naphtha may be added directly to the top section of the sponge absorber as taught by the prior art, it has been found that better absorption in the sponge absorber is obtained by mixing the stabilized naphtha with the off-gas from the sponge absorber, then condensing the gas to form a sponge oil which is then used in the sponge absorber, while separating a sour off-gas stream and condensed water stream. The condensed water may be mixed with water from the bottoms of the sponge absorber to form a sour water stream.

The flexibility of the process enables to tailor the amount of stabilized naphtha being used depending on the desired LPG recovery. The higher the amount of stabilized naphtha used, the higher the LPG recovery. For instance, LPG recovery can be increased even more than the already satisfactory 90-95%, for instance to 96-97% by increasing the amount of stabilized naphtha used in the sponge absorber, yet at the expense of higher reboiler duty.

In yet another embodiment in connection with any of the above or below embodiments, step (b) comprises the sub-steps:

(b1) fractionating the light oil stream in a deethanizer column, and separating the overhead vapour in the form of said $C_3$ stripped stream from the top section of the deethanizer column;

(b2) fractionating a stream from the bottom section of the deethanizer column in a debutanizer column, separating said LPG product stream from the top section of the debutanizer column, and said stabilized naphtha stream from the bottom section of the debutanizer column.

Preferably the stream from the bottom section of the deethanizer, i.e. deethanizer bottom product, has a low $H_2S$ content, for instance 2 wppm or below.

Step (b1) of separating the overhead vapour in the form of said $C_3$ stripped stream from the top section of the deethanizer column is conducted without condensing and without recycling into the top section of the deethanizer column. Further, by conducting the process with the deethanizer column upstream the debutanizer column it is possible to reduce the operating pressure of downstream equipment. In addition, the deethanizer removes not only ethane ($C_2H_6$) but also $H_2S$ from the LPG early in the process, since it is now possible to take advantage of $H_2S$ having a boiling point 18° C. lower than propane ($C_3H_8$). While a debutanizer upstream the deethanizer requires the use of LPG amine absorber (amine scrubber) and water wash to remove $H_2S$ in the normally highly sour LPG product resulting from this debutanizer, the present invention eliminates the need of a LPG amine absorber and water wash. These benefits outweigh by far the otherwise apparent disadvantage of needing a higher reboiler duty and larger size of the deethanizer column.

In another particular embodiment in connection with any of the above or below embodiments, the process further comprises using a portion of vapour from the debutanizer column as stripping vapour for the deethanizer column. This enables thermal coupling of the deethanizer and debutanizer columns thereby eliminating the use of a reboiler in the deethanizer. It has been found also that by controlling the flow of vapour outlet from the top of the deethanizer, the stripping vapour to the deethanizer can be controlled to get the required specification of hydrogen sulphide in the LPG product. In addition, due to the thermal coupling, the total reboiler duty, which is now limited to the duty of the debutanizer reboiler, is reduced significantly, for instance by about 15% with respect to a case where there is no such thermal coupling (e.g. 5.7 MW with thermal coupling vs 6.9 MW without thermal coupling). Suitably, the process further comprises feeding the vapour from the debutanizer column to the bottom tray of the deethanizer column. In this manner, best use of the thermal coupling is achieved and process flexibility is significantly increased. In particular, $H_2S$ content in the LPG product can be reduced even down to 1 wppm by increasing the amount of stripping vapour to the deethanizer. Although this further $H_2S$ reduction occurs at the expense of higher reboiler duty and increased size of some of the equipment, the possibility of obtaining such a low $H_2S$ content in the LPG product, when required, is highly attractive, for instance where LPG is needed for automotive or domestic applications which require max 5 wppm $H_2S$ in the LPG product.

In yet another embodiment in connection with one of the above or below embodiments, step (b) is conducted in a single column in the form of a dividing wall column. This enables reduced plot area, which is a significant parameter in highly crowded plant sites where space is scarce and which is often the case in refineries. Furthermore, this embodiment enables significant costs savings in terms of reduction of equipment which now becomes unnecessary, such as a fractionation column, reboiler, pumps, etc.

Best results are also obtained, where the dividing wall is provided at the upper section of the column, by the dividing wall extending from top to bottom and crossing 70% or less of the trays of the column. By way of example only, in a dividing wall column having ten trays, the dividing wall will extend from top of column down to the seventh tray or above, such as down to the sixth, fifth or fourth tray.

In addition, as with the embodiment comprising the deethanizer and debutanizer as separate columns, LPG recovery can be increased to 96-97% when using a single dividing wall column by increasing the amount of stabilized naphtha stream which is supplied to the off-gas from the sponge absorber. Although this occurs at the expense of a higher reboiler duty and increased size of some equipment, flexibility is enabled when stricter requirements on LPG recovery and $H_2S$ content in the LPG product are needed.

For instance, achieving a $H_2S$ content in LPG product of 1 wppm and 96-97% LPG recovery with the dividing wall column embodiments results in an increase in total reboiler duty of about 40% compared to when using thermally coupled deethanizer and debutanizer columns (e.g. 5.7 MW for the latter versus 8 MW for the dividing wall column). Still, the process enables flexibility to cope with stricter LPG recovery and product requirements, while at the same time significantly reducing plot size.

Suitably, the refinery process is: hydroprocessing preferably hydrocracking, crude distillation, fluid catalytic cracking, or delayed coking. Hydrocracking represents the most suitable refinery process as hydrocracking is one of the most profitable process units in a refinery.

In a second aspect the invention also provides a plant for the production of an LPG product by recovering it from the fractionation section of a refinery process, as illustrated schematically in the accompanying figures. Hence, there is also provided a plant for recovering LPG from the fractionation section of a refinery process comprising an arrangement of:
- a sponge absorber (LPG absorber) comprising an inlet for feeding a stream comprising a stripper overhead product, top and bottom sections for producing respectively an off-gas stream and a light oil stream (LPG rich stream), the top section comprising an outlet for withdrawing the off-gas stream and the bottom section comprising an outlet for withdrawing the light oil stream;
- a deethanizer column comprising an inlet for feeding the light oil stream from the sponge absorber, a top and bottom section for producing respectively an overhead vapour in the form of a $C_3$ stripped stream and bottoms stream, the top section being provided with no overhead condenser and comprising an outlet for withdrawing the overhead vapour in the form of a $C_3$ stripped stream, and the bottom section comprising an outlet for withdrawing the bottoms stream;
- a debutanizer column comprising an inlet for feeding the bottoms stream from the deethanizer column, a top and bottom section for producing respectively a LPG product stream and a stabilized naphtha stream, the top section comprising an outlet for withdrawing the LPG product stream, and the bottom section comprising an outlet for withdrawing the stabilized naphtha stream.

In a particular embodiment in connection with the above embodiment according to the second aspect of the invention and anyone of the below embodiments, the deethanizer column and debutanizer column are provided within a single column in the form of a dividing wall column. This particular embodiment may also be formulated as a plant for recovering LPG from the fractionation section of a refinery process comprising an arrangement of:
- a sponge absorber (LPG absorber) comprising an inlet for feeding a stream comprising a stripper overhead product, a top and bottom sections for producing respectively an off-gas stream and a light oil stream (LPG rich stream), the top section comprising an outlet for withdrawing the off-gas stream and the bottom section comprising an outlet for withdrawing the light oil stream;
- a fractionation column, preferably a dividing wall column, comprising an inlet for feeding the light oil stream from the sponge absorber, a top section for producing an overhead vapour in the form of a $C_3$ stripped stream from one side of the dividing wall and a LPG product stream from the other side of the dividing wall, and a bottom section comprising an outlet for withdrawing a stabilized naphtha stream.

As with the process embodiments, best results are also obtained, where the dividing wall is provided at the upper section of the column, by the dividing wall extending from top to bottom and crossing 70% or less of the trays of the column. By way of example only, in a dividing wall column having ten trays, the dividing wall will extend from top of column down to the seventh tray or above, such as down to the sixth, fifth or fourth tray.

In another embodiment in connection with one of the above or below embodiments according to the second aspect of the invention, the sponge absorber further comprises an overhead condenser and overhead drum at the top section. Preferably the plant further comprises means for supplying a portion of the stabilized naphtha stream to the off-gas stream (from the sponge absorber). Upstream the overhead condenser and overhead drum, means for mixing stabilized naphtha stream with the off-gas stream is provided. This overhead condenser enables therefore the provision of a reflux stream to the sponge absorber of the resulting mixture in the form of sponge oil. This provides significant advantages in the LPG absorption with respect to simply adding stabilized naphtha to the top section of the sponge absorber. From the overhead drum a sour off-gas is separated, as so is condensed water which may be mixed with the bottoms water stream of the sponge absorber to form a sour water stream for further treatment downstream.

In another embodiment in connection with one of the above or below embodiments according to the second aspect of the invention, the plant further comprises means for supplying the overhead vapour in the form of said $C_3$ stripped stream into a stripper overhead product inlet stream to form said inlet for feeding a stream comprising a stripper overhead product.

Accordingly, the inlet for feeding a stream comprising a stripper overhead product may contain: a stripper overhead product, stripper overhead product mixed with overhead vapour in the form of a $C_3$ stripped stream, stripper overhead product mixed with any other stream.

In another embodiment in connection with one of the above or below embodiments according to the second aspect of the invention, the plant further comprises means for supplying a portion of vapour from the debutanizer column as stripping vapour for the deethanizer column. As with the process embodiments, thermal coupling of the deethanizer and debutanizer columns is obtained resulting in less reboiler duty for these two columns, as the deethanizer reboiler becomes obsolete.

In yet another embodiment in connection with one of the above or below embodiments according to the second aspect of the invention, the refinery process is:

hydroprocessing preferably hydrocracking, crude distillation, fluid catalytic cracking, or delayed coking.

BRIEF DESCRIPTION OF THE FIGURES

The accompanying figures show specific embodiments of the invention.

DETAILED DESCRIPTION

Figure 1:
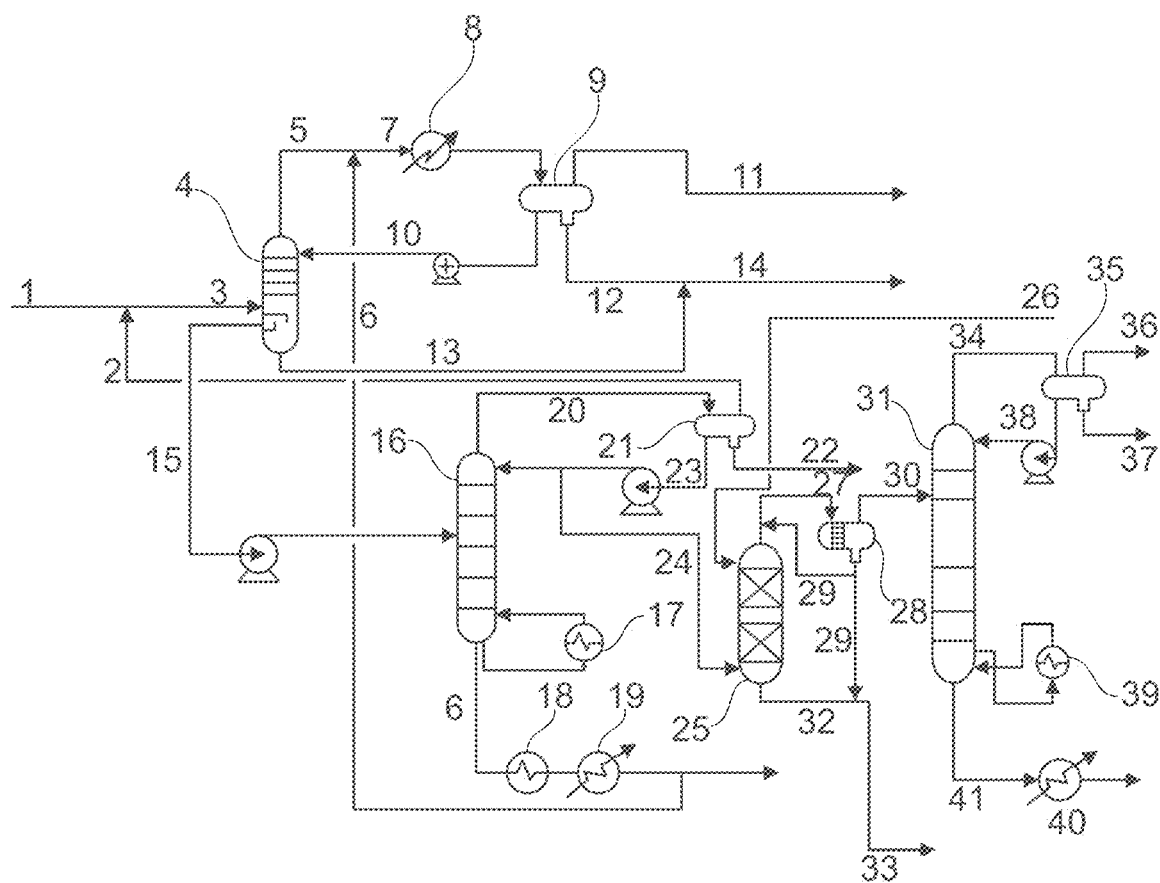
FIG. 1 shows a simplified process and plant arrangement for the recovery of LPG from the fractionation section of a hydrocracking unit according to the prior art comprising a debutanizer column upstream the deethanizer column.

In FIG. 1 (prior art) stripper overhead product 1 from a hydrocracking unit (not shown) is mixed with debutanizer overhead gas 2 to form a feed stream 3 that is passed through sponge absorber (LPG absorber) 4. At the top section of sponge absorber an off-gas 5 is withdrawn and mixed with stabilized naphtha stream 6. The mixture 7 is cooled and condensed in in cooler 8, sent to overhead drum 9 and pumped to the top section of sponge absorber 4 as sponge oil 10. From overhead drum 9 a sour off-gas 11 and condensed water 12 are withdrawn. The condensed water 12 is mixed with bottoms stream 13 from the sponge absorber 4 to form sour water stream 14. From the bottom section of the sponge absorber 4 a light oil stream 15 rich in LPG (rich in propane and butane) is withdrawn and pumped to a fractionation section comprising a debutanizer column 16, LPG amine absorber 25, and deethanizer column 31. The light oil stream 15 enters first into the debutanizer column 16. In the bottom section of the debutanizer 16 a reboiler 17 is provided, and bottoms stream in the form of stabilized naphtha 6 is cooled in heat exchanger 18 and then trim cooler 19 before being mixed with off-gas 5 from sponge absorber 4. Heat exchanger 18 may suitably be used as means to heat the light oil stream 15 instead. From the top section of debutanizer 16 an overhead gas 20 is cooled and condensed (condenser not shown) and sent to overhead drum 21. From this overhead drum 21 condensed sour water stream 22 is withdrawn as so is a debutanizer overhead gas 2 which is mixed with the stripper overhead product stream 1 as described above. A reflux stream 23 is separated from overhead drum 21 and a portion is pumped as debutanizer reflux stream to top section of debutanizer column 16, while the other portion 24 is used as feed stream to LPG amine absorber 25 (amine scrubber). This unit 25 removes hydrogen sulphide and carbon dioxide by using a lean amine such as an alkanolamine (monoethanolamine, diethanolamine, etc) as is well known in the art. Overhead liquid stream 27 from LPG amine absorber 25 is washed with a circulating water stream 29 and passed through LPG coalescer unit 28 from which water 29 is withdrawn. The washed LPG stream 30 is fed to the deethanizer column 31. From the LPG amine absorber 25 a bottoms rich amine stream 32 is withdrawn, mixed with water 29 from coalescer 28 and sent as stream 33 to an amine regenerator. Deethanizer overhead gas 34 is cooled and condensed (condenser not shown) and sent to deethanizer overhead drum 35 where off-gas stream 36 and water stream 37 are withdrawn. A condensed HC-stream 38 is used as reflux to the deethanizer column 31. The bottom section of the deethanizer 31 is provided with reboiler 39. Finally, an LPG product stream 41 is cooled in air cooler (not shown) and a trim cooler.

Figure 2:
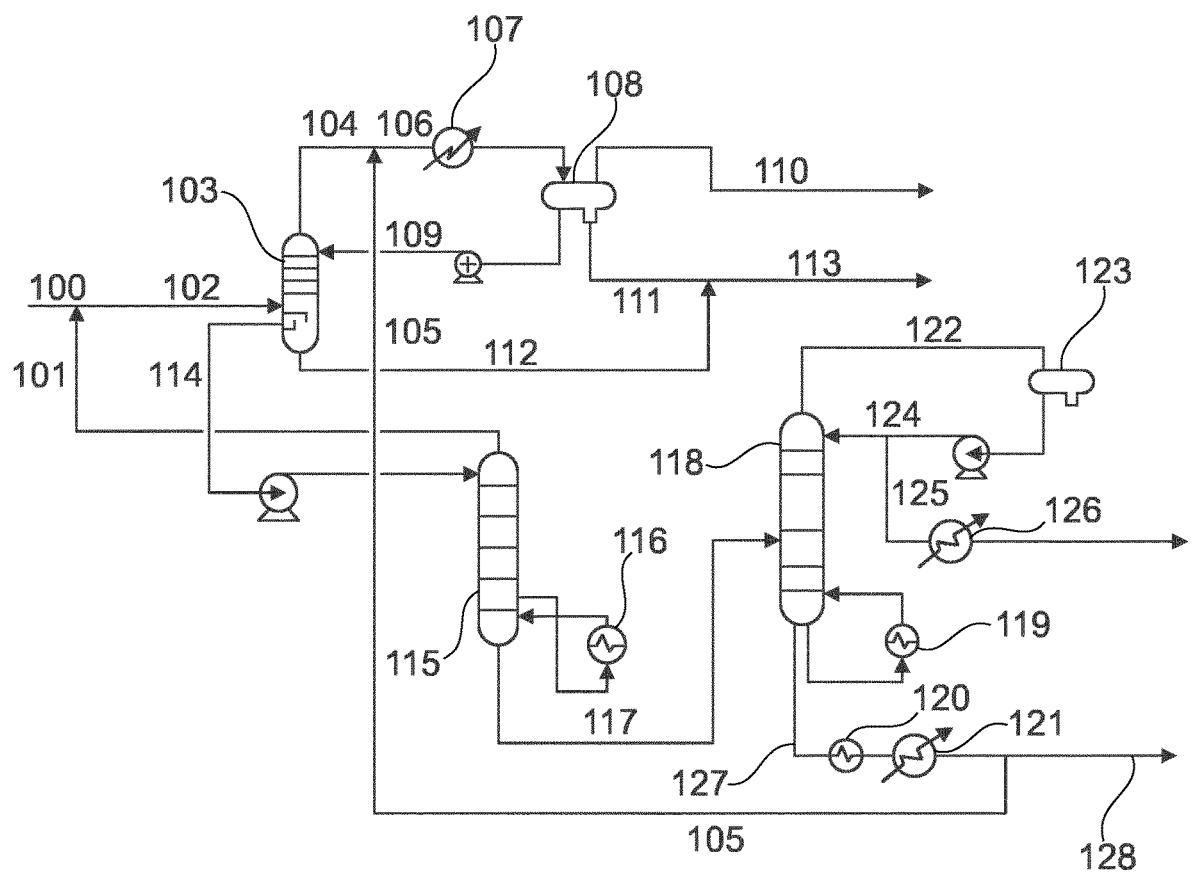
FIG. 2 shows a simplified process and plant arrangement according to a particular embodiment of the present invention comprising a deethanizer column upstream the debutanizer column.

FIG. 2 shows an embodiment according to the present invention. Stripper overhead product 100 from a hydrocracking unit (not shown) is mixed with deethanizer overhead gas in the form of a $C_3$ stripped stream 101 to form a feed stream 102 that is passed through sponge absorber (LPG absorber) 103. At the top section of sponge absorber 103 off-gas 104 is withdrawn and mixed with stabilized naphtha stream 105. The mixture 106 is cooled and condensed in cooler 107, sent to the overhead drum 108 and pumped to the top section of sponge absorber 103 as sponge oil 109. From overhead drum 108 a sour off-gas 110 and condensed water 111 are withdrawn. The condensed water 111 is mixed with bottoms water stream 112 from the sponge absorber 103 to form sour water stream 113. From the bottom section of the sponge absorber 103 a light oil stream 114 rich in LPG, i.e. rich in propane and butane, is withdrawn and pumped to a fractionation section comprising deethanizer column 115 and debutanizer column 118. The light oil stream 114 enters first into the deethanizer column 115. In the bottom section of the deethanizer 115 a reboiler 116 is provided, and bottoms stream 117 is then used as feed for debutanizer column 118. The reboiler duty is adjusted to reduce $H_2S$ content in bottoms stream to below say 2 wppm or lower. The top section of deethanizer column 115 is purposely not provided with overhead condenser and thereby there is no recycling of overhead liquid as reflux into this fractionating step. This overhead vapour stream 101 ($C_3$ stripped stream) is mixed with the stripper overhead stripper product 100 as described above. Bottoms stream 117 from bottom section of deethanizer 115 is fed to debutanizer column 118 comprising a top and bottom section. In the bottom section a reboiler 119 is provided and bottoms stream in the form of stabilized naphtha stream 127 is cooled in heat exchanger 120 and then in trim cooler 121. The cooled stabilized naphtha stream is split to a naphtha product stream 128 and a recycle stream 105, which is mixed with off-gas 104 from sponge absorber 103 as described above. From the top section of debutanizer 118 an overhead gas 122 is cooled and condensed (condenser not shown) and sent to the overhead drum 123. From this overhead drum 123 a portion is pumped as debutanizer reflux stream 124 to top section of debutanizer column 118, while the other portion 125 is cooled in heat exchanger 126 and recovered as LPG product.

Figure 3:
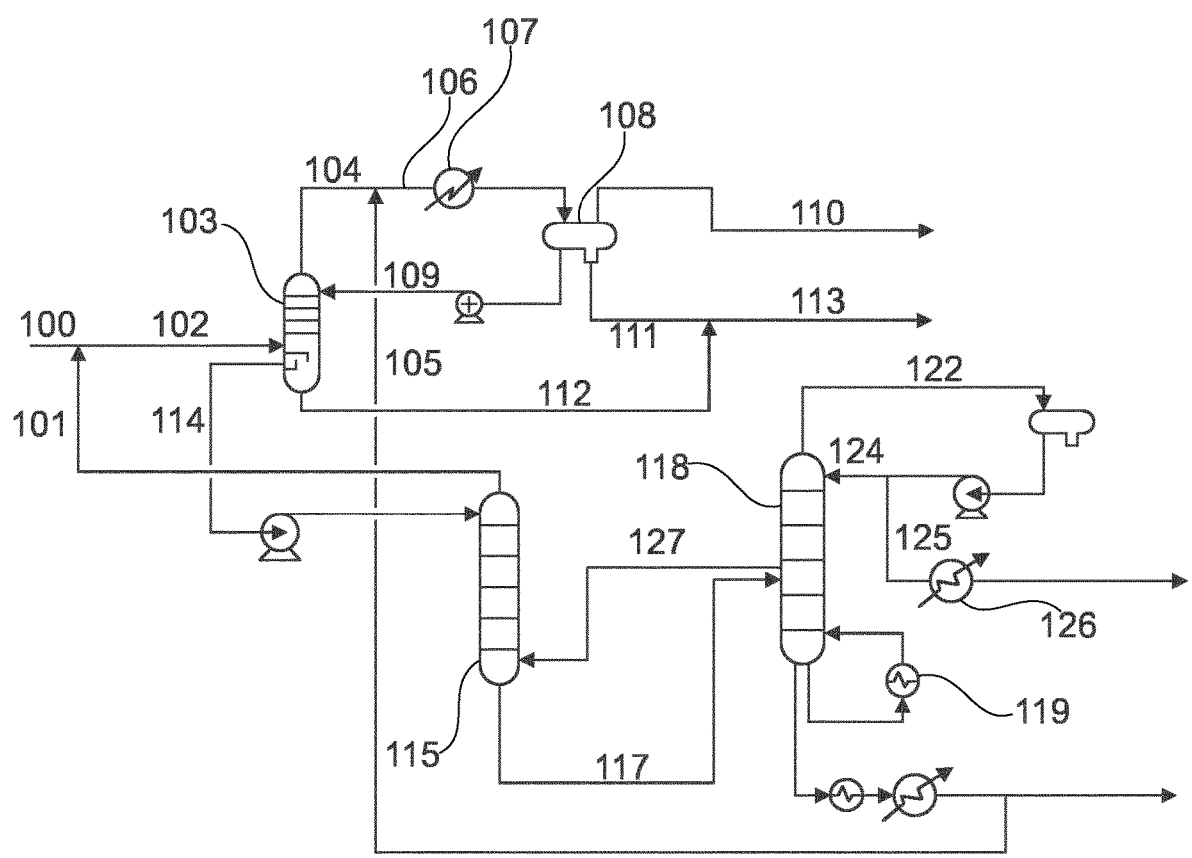
FIG. 3 shows a simplified process and plant arrangement according to another particular embodiment of the present invention comprising a deethanizer column upstream the debutanizer column with thermal coupling between these columns.

In FIG. 3 the thermal coupling of deethanizer and debutanizer columns is illustrated. Same ref. numerals as FIG. 2 apply with the modification that reboiler 116 of deethanizer 115 becomes obsolete. In FIG. 3 means (e.g. a conduit) 127 is provided for supplying a portion of vapour from the debutanizer column 118 as stripping vapour for the deethanizer column 115.

Figure 4:
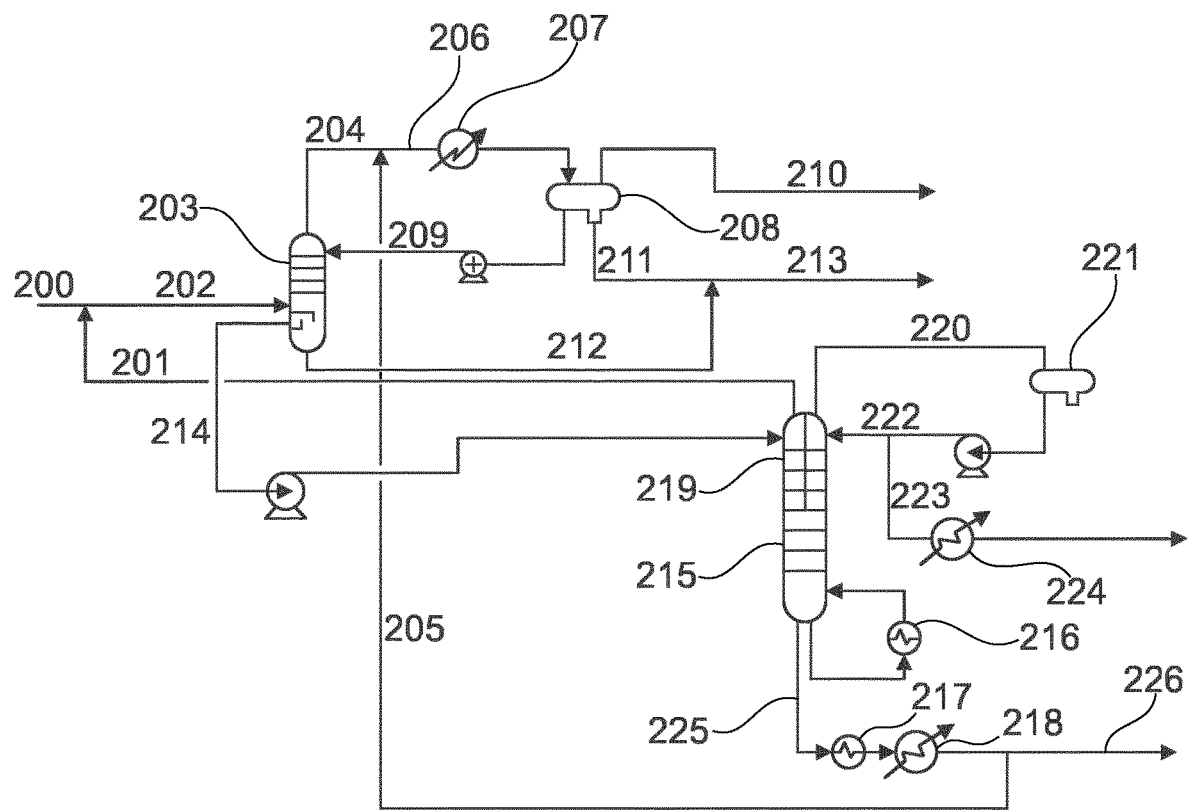
FIG. 4 shows a simplified process and plant arrangement according to yet another particular embodiment of the invention in which the deethanizer and debutanizer are provided within a single column.

In FIG. 4 the deethanizer and debutanizer columns are provided as a single column in the form of a dividing wall column 215. Stripper overhead product 200 from a hydrocracking unit (not shown) is mixed with overhead gas in the form of a $C_3$ stripped stream 201 to form a feed stream 202 that is passed through sponge absorber (LPG absorber) 203. At the top section of sponge absorber 203 off-gas 204 is withdrawn and mixed with stabilized naphtha stream 205. The mixture 206 is cooled and condensed in cooler 207, sent to overhead drum 208 and pumped to the top section of sponge absorber 203 as sponge oil 209. From overhead drum 208 a sour off-gas 210 and condensed water 211 are withdrawn. The condensed water 211 is mixed with bottoms stream 212 from the sponge absorber 203 to form sour water stream 213. From the bottom section of the sponge absorber 203 a light oil stream 214 rich in LPG is withdrawn and pumped to a fractionation section comprising now a single column in the form of a dividing wall column 215. In a dividing wall column, three product streams are formed: a $C_3$ stripped stream 201, a stabilized naphtha stream and an LPG product stream. A dividing wall 219 extends from the top of the column down to a relevant tray within the column, suitable down to 70% from the top, for instance down to the seventh plate assuming a column having 10 trays. From the top section on one side of dividing wall, the $C_3$ stripped stream 201 is withdrawn and mixed with the stripper overhead product 200. In the bottom section a reboiler 216 is provided and bottoms stream in the form of stabilized naphtha stream 225 is cooled in heat exchanger 217 and then in trim cooler 218 before being split to a recycle stream 205 and a stabilized naphtha product stream 226. Stream 205 is mixed with off-gas 204 from sponge absorber 203. From the top section on other side of the dividing wall column 215, an overhead gas 220 is cooled and condensed (condenser not shown) and sent to the overhead drum 221. From this overhead drum 221 a portion is pumped as reflux stream 222 to top section of dividing wall column 219, while the other portion 223 is cooled in heat exchanger 224 and recovered as LPG product.

EXAMPLE

The performance of the different processes/plants as shown in FIGS. 1-4 was calculated. The performance is shown in terms of LPG recovery as wt % LPG in product stream (e.g stream 41 in FIG. 1 or stream 125 in FIG. 2, with respect to stripper overhead product stream 1 in FIG. 1 or stream 100 in FIG. 2), $H_2S$ content in LPG product stream, electrical consumption of pumps used for circulating different streams in the processes, total reboiler duty, lean amine consumption in LPG amine absorber, and consumption of boiler feed water (BFW) as wash water. The results are presented in Table 1. Notably also, as one moves from the embodiment of FIG. 1 to FIG. 4, plot size area is significantly reduced.

TABLE 1

| Performance parameter | FIG. 1 prior art | FIG. 2 invention | FIG. 3 invention | FIG. 4 invention |
|---|---|---|---|---|
| LPG recovery % | 95.6 | 94.8 | 93.7 | 93.7 |
| $H_2S$ in LPG, wppm | 35 | 9 | 9 | 9 |
| Relative electric consumption | 97 | 43 | 48 | 48 |
| Total reboiler duty, MW | 5.9 | 6.9 | 5.7 | 5.7 |
| Lean amine consumption in LPG absorber, kg/h | 10000 | none | none | none |
| BFW wash water, kg/h | 191 | none | none | none |

What is claimed is:

1. A process for recovering LPG from a fractionation section of a refinery process comprising the steps of:
   (a) passing a feed stream comprising a stripper overhead product through a sponge absorber, and separating an off-gas stream from a top section of the sponge absorber and a light oil stream from a bottom section of the sponge absorber; and
   (b) fractionating the light oil stream into:
      (i) an overhead vapour in the form of a $C_3$ stripped stream comprising less than 20% butane or propane, without condensing and without recycling of condensed overhead vapour in the fractionating step;
      (ii) a LPG product stream; and
      (iii) a stabilized naphtha stream.

2. The process according to claim 1 further comprising mixing at least a portion of the $C_3$ stripped stream of step (b) with the stripper overhead product to form the feed stream of step (a).

3. The process according to claim 1 further comprising mixing a portion of the stabilized naphtha stream of step (b) with the off-gas stream of step (a).

4. The process according to claim 1 in which step (b) comprises the sub-steps:
   (b1) fractionating the light oil stream in a deethanizer column, and separating the overhead vapour in the form of the $C_3$ stripped stream from a top section of the deethanizer column;
   (b2) fractionating a stream from a bottom section of the deethanizer column in a debutanizer column, separating the LPG product stream from a top section of the debutanizer column, and the stabilized naphtha stream from a bottom section of the debutanizer column.

5. The process according to claim 4 further comprising using a portion of vapour from the debutanizer column as stripping vapour for the deethanizer column.

6. The process according to claim 5 further comprising feeding the vapour from the debutanizer column to the bottom section of the deethanizer column.

7. The process according to claim 1, in which step (b) is conducted in a single column in the form of a dividing wall column.

8. The process according to claim 7 in which the dividing wall is provided at the upper section of the column.

9. The process according to claim 1 in which the refinery process is:
   hydroprocessing comprising hydrocracking, crude distillation, fluid catalytic cracking, or delayed coking.

10. The process of claim 1, wherein the only off-gas from the process for recovering LPG is taken from the off-gas stream of the sponge absorber.

11. The process of claim 1, comprising mixing the entire $C_3$ stripped stream of step (b) with stripper overhead product to form the feed stream of step (a).

* * * * *